(12) United States Patent
Shi et al.

(10) Patent No.: US 10,345,569 B2
(45) Date of Patent: Jul. 9, 2019

(54) ZOOM OBJECTIVE LENS

(71) Applicant: Carl Zeiss Microscopy GmbH, Jena (DE)

(72) Inventors: Renhu Shi, Göttingen (DE); Ingo Fahlbusch, Göttingen (DE); Matthias Gonschor, Gleichen (DE); Michael Gögler, Wolfratshausen (DE); Holger Richter, Neu-Eichenberg (DE); Harald Schadwinkel, Hannover (DE); Jörg Schaffer, Göttingen (DE); Robin zur Nieden, Göttingen (DE)

(73) Assignee: Carl Zeiss Microscopy GMBH, Jena (DE)

( * ) Notice: Subject to any disclaimer, the term of this patent is extended or adjusted under 35 U.S.C. 154(b) by 0 days.

(21) Appl. No.: 15/371,480

(22) Filed: Dec. 7, 2016

(65) Prior Publication Data

US 2017/0176731 A1 Jun. 22, 2017

(30) Foreign Application Priority Data

Dec. 17, 2015 (DE) .......................... 10 2015 225 641

(51) Int. Cl.
| | | |
|---|---|---|
| G02B 15/14 | (2006.01) | |
| G02B 21/02 | (2006.01) | |
| G02B 9/60 | (2006.01) | |
| H04N 7/18 | (2006.01) | |
| G02B 7/10 | (2006.01) | |
| G02B 15/167 | (2006.01) | |

(52) U.S. Cl.
CPC ............. *G02B 21/025* (2013.01); *G02B 7/10* (2013.01); *G02B 7/102* (2013.01); *G02B 15/167* (2013.01)

(58) Field of Classification Search
CPC ...... G02B 15/173; G02B 21/02; G02B 13/18; G02B 13/02; G02B 13/04; G02B 9/60; G02B 13/16; G02B 9/34; G02B 21/365; G02B 21/24; H01J 37/28; H04N 5/2252
USPC ....... 359/684, 656, 659, 657, 658, 676, 714, 359/713, 746, 753, 763, 764, 767, 770, 359/671; 348/79–81
See application file for complete search history.

(56) References Cited

U.S. PATENT DOCUMENTS

| | | | |
|---|---|---|---|
| 2004/0032672 A1* | 2/2004 | Hankawa ................. | G02B 5/04 359/833 |
| 2007/0139786 A1* | 6/2007 | Iwasawa ............ | G02B 13/0045 359/676 |
| 2008/0198484 A1* | 8/2008 | Shinohara ............ | G02B 15/177 359/770 |

(Continued)

*Primary Examiner* — Dawayne Pinkney
(74) *Attorney, Agent, or Firm* — Nixon Peabody LLP; Jeffrey L. Costellia (57) ABSTRACT

The invention relates to a zoom objective lens with continuously adjustable magnification, comprising five lens groups, where the first lens group, the second lens group and the fifth lens group are fixed in relation to an object. The third lens group and the fourth lens group are axially displaceable. The following conditions apply to the lens:
the variable air gap between the second lens group and the third lens group decreases or has a turning point with a transition from a low to a high magnification β,
the refractive power of the second, third and fifth lens groups is positive and
the refractive power of the fourth lens group is negative.

10 Claims, 6 Drawing Sheets

(56) References Cited

U.S. PATENT DOCUMENTS

2009/0310209 A1* 12/2009 Aschwanden ....... G02B 5/1828
359/291
2017/0261728 A1* 9/2017 Shibata .................. G02B 15/20

* cited by examiner

ZOOM OBJECTIVE LENS

TECHNICAL FIELD

The invention relates to a zoom objective lens with continuously adjustable magnification, comprising five lens groups, the first lens group, the second lens group and the fifth lens group being fixed in relation to an object and the third lens group and the fourth lens group being axially displaceable.

BACKGROUND

In microscopy, the magnification factor can typically be adjusted by rotating the nosepiece to use objective lenses of different magnifications in, by switching to tube lenses of different focal lengths, by adding (at least in front of the tube lenses) afocal subsystems set to infinity, by using a pancratic (afocal) system in the stand, or by digital zooming.

Rapid rotation of nosepiece for changing objective lenses, switching to tube lenses and adding afocal subsystems can result in severe fluctuations in the stand, abrupt changes in image brightness, and focus drift. Moreover, a change of the objective lens in the nosepiece frequently also necessitates a change of the immersion medium, which requires the microscopist to immerse the preparation or to remove the preparation from immersion and then relocate the position of the specimen.

Although the use of a pancratic system requires much greater structural space in the stand, digital "zooming", in which "zooming" is defined as a continuous change in magnification, merely changes the magnification without adjusting the resolution.

The first aspect relates to compactness. All zoom systems have variable air gaps for adjusting the beam penetration depth of the aperture beam and the main beam.

The aperture beam is the beam that proceeds from the axial object point and strikes the rim of the aperture, whereas the main beam is defined as the beam that proceeds from the highest field point and travels through the center of the pupil.

Therefore the focal length (that is to say, magnification) and not the back focal length (focus) is changed. Image defects are optimized as a result.

Variations in the air gaps result in an increase in the structural sizes of zoom systems, particularly with a high zoom factor.

However, compactness (that is to say, the shortest possible structural length) is always desirable in a stand designed to benefit customers.

U.S. Pat. No. 6,674,582 specifies a multiplicity of embodiment examples of zoom objective lenses 10×/0.25 to 40×/0.60 (0.80) made by Olympus. These are intended for theoretical studies and not for manufacturing. Disadvantages of these solutions include the following:
- the objective lenses have a built-in aperture diaphragm, the diameter of which must be adjusted dependent on the magnification,
- the objective lenses have 16 to 20 lenses, a number of which have a plurality of aspherical surfaces and
- the structural length is relatively large.

The objective lenses can be produced only at extremely high cost, if they can even be manufactured at all.

The continuous change in magnification (zooming) is a significant aspect. In all magnification ranges, the correction of image defects is diffraction limited. Focal positions are also maintained during zooming. This enables viewers to constantly keep the position of interest (region of interest) of the specimen in view during zooming and thereby avoid image losses.

Even if the focal distance remains constant for all magnifications in the design phase, the tolerance values result in fluctuations in the focal distance which are dependent on the respective magnification. The fluctuations are subsequently measured and recorded for each objective lens. The data are then transferred to the stand. When the magnification of an objective lens is changed, it can then be automatically refocused with the help of these data, as long as the stand supports such a function.

No published optical design exists as yet for microscope objective lenses that have a zoom function and also have the following properties:
- structural length ≤63.56 mm,
- semi-apochromatic correction without asphere,
- continuous magnification adjustment with 4× zoom,
- numerical aperture up to 0.8 and
- number of lenses ≤14.

The structural length is the length from the object plane to the front diaphragm, while the parfocal length is defined as the length from the object plane up to the objective lens mounting surface.

For microscopy, zoom objective lenses having a parfocal length of 45 mm and a structural length of 48.56 mm and having a cover glass of 0.17 mm are not feasible. The next ISO standardized stage for parfocal length would be 60 mm with a structural length of 63.56 mm and a cover glass of 0.17 mm.

In view of the disadvantages of the prior art, the object of the invention is to improve upon a zoom objective lens for microscopy such that the cost of producing the objective lens with a minimal structural size is decreased, while the working distance remains constant, so that the object always remains in focus with a change in magnification.

BRIEF DESCRIPTION

This object is attained with a zoom objective lens of the type described in the introductory part of this document having the features of claim 1. Advantageous embodiments are specified in dependent claims 2 to 6.

According to the invention, the variable air gap (L1v) between the second lens group (G2) and the third lens group (G3) decreases or involves a turning point during a transition from a low to a high magnification.

The refractive power of the second, third and fifth lens groups (G2, G3, G5) is positive, whereas the refractive power of the fourth lens group (G4) is negative.

The first lens group is advantageously a single meniscus lens which is used without an immersion, or if an immersion is used, said lens group consists of a cemented lens component in which the front lens has a planar surface oriented toward the object side, whereas the second lens group consists of at least one single lens with positive refractive power and one cemented lens component.

The third lens group comprises two lenses, which are either separate or cemented to one another, the fourth lens group consists of either a dual cemented lens component or a dual cemented lens component and a single lens. The dual cemented lens component comprises a meniscus lens, the centers of curvature of which are on the object side, and the two lens groups are displaced by means of two adjustment elements, each of which is driven manually and/or in a motorized fashion by means of a correcting ring.

The fifth lens group is a dual cemented lens component, in which the biconvex lens is located on the imaging side. The lenses advantageously have rims for the purpose of delimiting the beam bundle.

In the solution according to the invention, four embodiments of microscope objective lenses are presented, having a zoom function and having a parfocal length of 60 mm and having a structural length of less than or equal to 63.56 mm.

The boundaries of the beam bundle are selected such that an adjustable aperture diaphragm within the objective lens is not required.

BRIEF DESCRIPTION OF THE DRAWINGS

In the following, the zoom objective lens according to the invention will be specified in greater detail in reference to embodiment examples. The appended drawings show.

The present disclosure is susceptible of various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF ILLUSTRATED EXAMPLES

Figure 1:
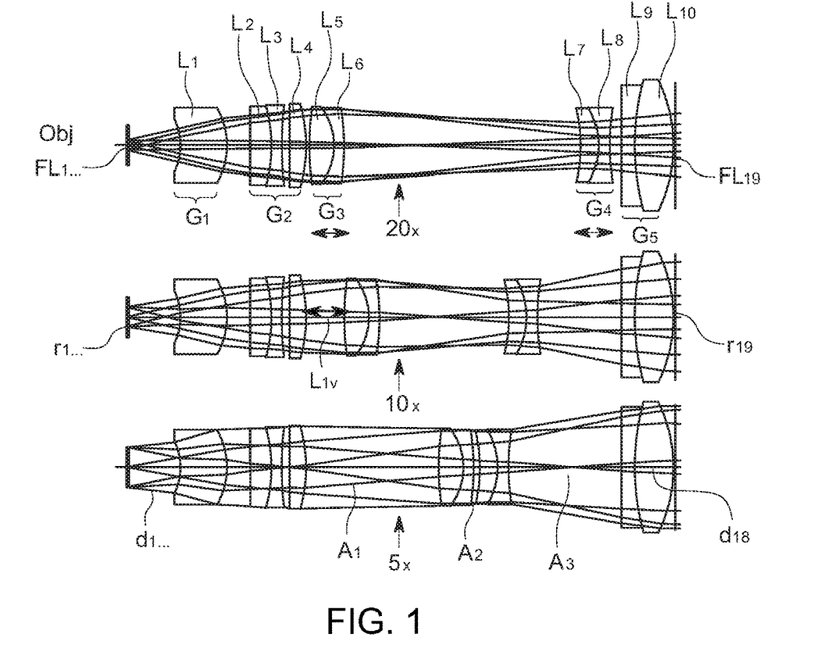
FIG. 1: a schematic representation of a first embodiment example of the zoom objective lens for a magnification of 5× to 20×.

FIG. 1 shows a schematic representation of a first embodiment of the zoom objective lens for magnifications β of 5× (minimum), 10× (medium) and 20× (maximum), comprising, coming from the object side Obj, the lens groups G1, G2, G3, G4 and G5, wherein the first lens group G1, the second lens group G2, and the fifth lens group G5 are fixed in relation to the object plane Obj, and the third lens group G3 and the fourth lens group G4 are axially displaceable and are characterized by variable air gaps A1, A2 and A3. The figure also shows surfaces FL11 to FL19 and radii r1 to r19 of lenses L1 to L10, and the thicknesses thereof, and air gaps d1 to d18. The variable air gap L1v=A1, designated as L1v, between lens groups G2 and G3 decreases with a transition from a low to a high magnification.

The first lens group G1 of the zoom objective lens shown in this embodiment example, which is used without immersion, consists of a single meniscus lens L1. The refractive power of each of lens groups G2, G3 and G5 is positive, whereas the refractive power of lens group G4 is negative.

Lens group G2 consists of at least one single lens L4 with positive refractive power and a cemented lens component consisting of at least two lenses L2 and L3.

Lens group G3 comprises two lenses L5 and L6, which are either separate or cemented, whereas lens group G4 consists of a dual cemented lens component consisting of lenses L7 and L8, in which the meniscus lens L7 and both centers of curvature thereof are on the objective side Obj. Lens group G5 is a dual cemented lens component comprising lenses L9 and L10, in which biconvex lens L10 is located on the image side.

The first embodiment of the zoom objective lens for magnifications β of 5× to 20× with numerical apertures NA of 0.18 (at magnification 5×) and 0.25 (at magnification 20×) is characterized by the design data shown in the following table, in which radii r1 to r19 and the thicknesses, or air gaps d1 to d18, or the variable air gaps A1, A2 and A3 are indicated in mm, while $n_e$ is the refractive index and $v_e$ is the Abbe number,

| Surface Number FL1-FL19 | Radius r1-r19 | Thickness d1-d18 | $n_e$ | $v_e$ |
| --- | --- | --- | --- | --- |
| 1 | flat | 0.170 | 1.526 | 54.3 |
| 2 | flat | 6.000 | | |
| 3 | −6.7653 | 5.400 | 1.808 | 46.3 |
| 4 | −8.4532 | 2.636 | | |
| 5 | 175.5037 | 2.571 | 1.530 | 76.6 |
| 6 | −14.5588 | 1.200 | 1.658 | 39.5 |
| 7 | 38.5031 | 0.800 | | |
| 8 | 129.2733 | 2.000 | 1.530 | 76.6 |
| 9 | −17.1705 | A1 | | |
| 10 | 29.1381 | 2.900 | 1.597 | 67.4 |
| 11 | −7.3667 | 1.200 | 1.617 | 44.3 |
| 12 | −24.3758 | A2 | | |
| 13 | −15.6934 | 2.000 | 1.813 | 25.2 |
| 14 | −8.0534 | 1.300 | 1.716 | 53.7 |
| 15 | 28.5432 | A3 | | |
| 16 | −783.1668 | 1.500 | 1.678 | 32.0 |
| 17 | 29.4250 | 4.500 | 1.489 | 70.2 |
| 18 | −16.6791 | 0.200 | | |
| 19 | flat | | | | and with an achromatically corrected tube having a focal length of 195 mm, which is known per se.

With an entry pupil set to infinity and a visual field index of 23, variable air gaps A1, A2 and A3 are characterized by the following variables:

| β | NA | A1 | A2 | A3 |
| --- | --- | --- | --- | --- |
| 5× | 0.18 | 15.327 | 0.800 | 13.056 |
| 7.5× | 0.20 | 9.613 | 8.862 | 10.707 |
| 10× | 0.23 | 4.401 | 15.069 | 9.712 |
| 15× | 0.23 | 2.852 | 21.831 | 4.499 |
| 20× | 0.25 | 0.350 | 27.432 | 1.400 | wherein the delimiting surface FL12 has a diameter of 8.50 mm.

Figure 2:
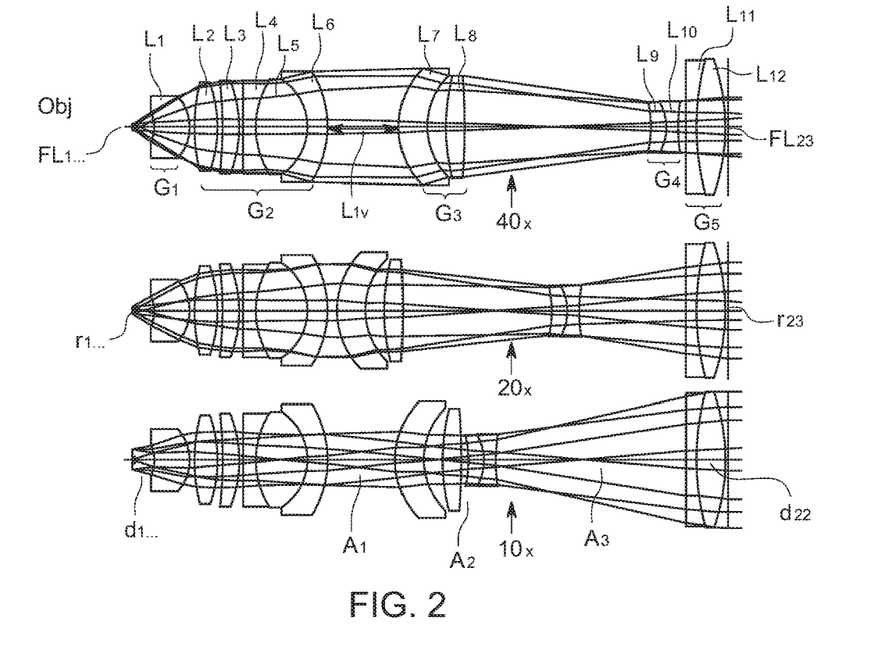
FIG. 2: a schematic representation of a second embodiment example of the zoom objective lens for a magnification of 10× to 40×.

FIG. 2 shows a schematic representation of a second embodiment of the zoom objective lens for magnifications of 10× (minimum), 20× (medium) and 40× (maximum), comprising, coming from the object side Obj, lens groups G1, G2, G3, G4 and G5, wherein, the first lens group G1, the second lens group G2, and the fifth lens group G5 are fixed in relation to the object plane, and the third lens group G3 and fourth lens group G4 are axially displaceable and are characterized by variable air gaps A1, A2 and A3. The figure further shows surfaces FL1 to FL23 and radii r1 to r23 of lenses L1 to L12 and the thicknesses or air gaps d1 to d22 thereof. In this case, the variable air gap L1v=A1, designated as L1v, between lens groups G2 and G3 has a turning point, not shown in greater detail, for a transition from a low to a high magnification.

First lens group G1 of the zoom objective lens shown in this embodiment, which is likewise used without immersion, consists of a single meniscus lens L1 like in the first embodiment. The refractive power of each of lens groups G2. G3 and G5 is positive, whereas the refractive power of lens group G4 is negative.

Lens group G2 consists of two individual lenses L2 and L3 and a triple cemented lens component consisting of lenses L4, L5 and L6, while Lens group G3 comprises two lenses L7 and L8, which are either separate, as shown in this embodiment, or alternatively cemented.

Lens group G4 is a dual cemented lens component consisting of lenses L9 and L10, in which the meniscus lens L9 and both of the centers of curvature thereof are located on the object side Obj.

Lens group G5 is a dual cemented lens component comprising lenses L11 and L12, in which biconvex lens L12 is located on the image side.

The second embodiment of the zoom objective lens for magnifications β of 10× to 40× with numerical apertures NA of 0.3 (at 10× magnification) and of 0.6 (at 40× magnification) is characterized by the design data showing in the following table, in which radii r1 to r23 and the thicknesses or air gaps d1 to d22 or the variable air gaps A1, A2 and A3 are given in mm, while $n_e$ is the refractive index and $v_e$ is the Abbe number:

| Surface Number FL1-FL23 | Radius r1-r23 | Thickness d1-d22 | $n_e$ | $v_e$ |
|---|---|---|---|---|
| 1 | Flat | 0.170 | 1.526 | 54.3 |
| 2 | Flat | 2.214 | | |
| 3 | −3.2550 | 3.680 | 1.758 | 52.1 |
| 4 | −5.1580 | 0.512 | | |
| 5 | 18.3030 | 2.500 | 1.498 | 81.1 |
| 6 | −14.0240 | 0.500 | | |
| 7 | −50.1187 | 1.800 | 1.530 | 76.6 |
| 8 | −12.9580 | 0.499 | | |
| 9 | −133.3541 | 1.200 | 1.658 | 39.5 |
| 10 | 9.3070 | 5.600 | 1.440 | 94.5 |
| 11 | −6.1313 | 2.150 | 1.658 | 39.5 |
| 12 | −11.3030 | A1 | | |
| 13 | 9.0390 | 3.000 | 1.620 | 63.1 |
| 14 | 7.6060 | 2.000 | | |
| 15 | 19.6700 | 2.050 | 1.530 | 76.6 |
| 16 | −66.8362 | A2 | | |
| 17 | −9.1730 | 1.650 | 1.624 | 36.1 |
| 18 | −5.0120 | 1.200 | 1.489 | 70.2 |
| 19 | 14.3310 | A3 | | |
| 20 | 325.4810 | 1.200 | 1.624 | 36.1 |
| 21 | 27.5827 | 3.100 | 1.530 | 76.6 |
| 22 | −21.9103 | 0.300 | | |
| 23 | Flat | | | | and further comprising an achromatically corrected tube having a focal length of 195 mm, which is known per se.

With an entry pupil set to infinity and a visual field index of 22, the variable air gaps A1, A2 and A3 are characterized by the following variables:

| β | NA | A1 | A2 | A3 |
|---|---|---|---|---|
| 10× | 0.30 | 7.217 | 0.800 | 20.217 |
| 20× | 0.45 | 0.500 | 13.258 | 14.477 |
| 30× | 0.55 | 2.505 | 17.785 | 7.944 |
| 40× | 0.60 | 7.570 | 19.864 | 0.800 | wherein the delimiting surfaces FL3, FL13, FL19 and FL23 have the following diameters:

| Surface Number | Diameter |
|---|---|
| FL3 | 3.04 |
| FL13 | 12.60 |
| FL19 | 5.44 |
| FL23 | 14.60 |

Figure 3:
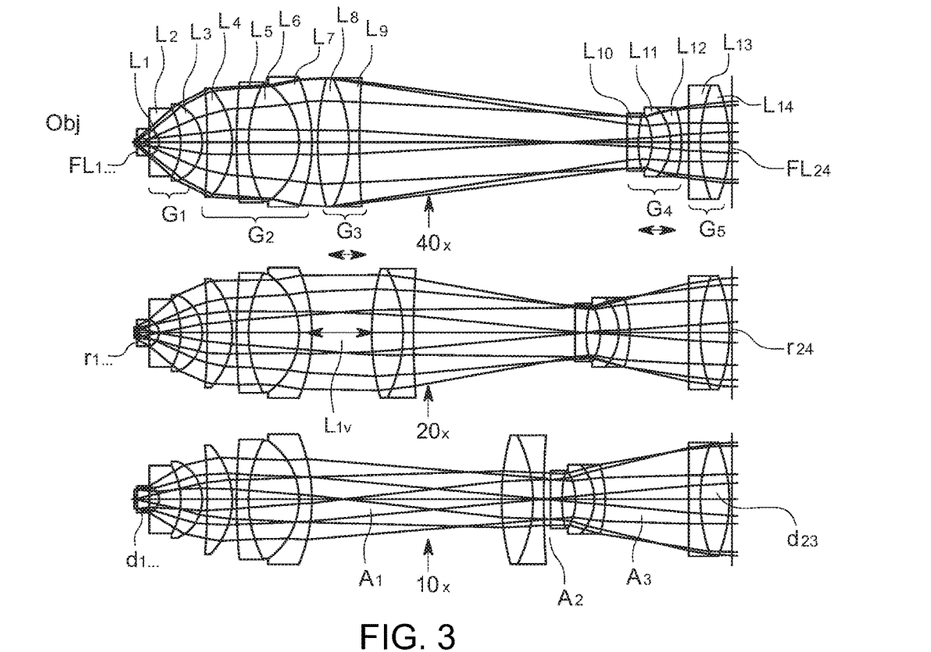
FIG. 3: a schematic representation of a third embodiment example of the zoom objective lens for a magnification of 10× to 40×.

FIG. 3 shows a schematic illustration of a third embodiment of the zoom objective lens for magnifications of 10× (minimum), 20× (medium) and 40× (maximum) comprising, coming from the object side Obj, lens groups G1, G2, G3, G4 and G5, in which, the first lens group G1 the second lens group G2 and the fifth lens group G5 are fixed in relation to the object plane Obj and the third lens group G3 and the fourth lens group G4 are axially displaceable and are characterized by variable air gaps A1. A2 and A3, as described in the previous embodiments. The figure further shows surfaces FL1 to FL24 and radii r1 to r24 of lenses L1 to L14 and the thicknesses or air gaps d1 to d23 thereof. The variable air gap L1v=A1, designated as L1v, between lens groups G2 and G3, decreases with a transition from a low to a high magnification.

First lens group G1 of the zoom objective lens is used with immersion, it consists of a cemented lens component comprising lenses L1, L2 and L3, wherein the front lens L1 has a flat surface on the object side Obj. The refractive power of each of lens groups G2, G3 and G5 is positive, whereas the refractive power of lens group G4 is negative.

In this case, lens group G2 consists of an individual lens L4 and a triple cemented lens component L5, L6 and L7, whereas lens group G3 has two lenses L8 and L9, which are either cemented as shown or alternatively separate.

Lens group G4 consists of an individual lens L10 and a dual cemented lens component, consisting of lenses L11 and L12, in which meniscus lens L11 and the two centers of curvature thereof are located on the object side Obj.

Lens group G5 is a dual cemented lens component having lenses L13 and L14, in which biconvex lens L14 is located on the image side.

The third embodiment example of the zoom objective lens, suited for magnifications β of 10× to 40× with numerical apertures NA of 0.3 (at magnification 10×) and 0.8 (at magnification 40×) is characterized by design data shown in the following table, in which radii r1 to r24 and the thicknesses or air gaps d1 to d23, and the variable air gaps A1, A2 and A3 are indicated in mm, while $n_e$ is the refractive index and $v_e$ is the Abbe number:

| Surface Number FL1-FL24 | Radius r1-r24 | Thickness d1-d23 | $n_e$ | $v_e$ |
|---|---|---|---|---|
| 1 | Flat | 0.170 | 1.526 | 54.3 |
| 2 | Flat | 1.300 | 1.334 | 55.9 |
| 3 | Flat | 1.100 | 1.489 | 70.2 |
| 4 | −1.4487 | 2.229 | 1.888 | 40.5 |
| 5 | −7.5654 | 2.400 | 1.620 | 63.1 |
| 6 | −4.3205 | 0.500 | | |
| 7 | −60.7020 | 2.650 | 1.530 | 76.6 |
| 8 | −8.2476 | 0.500 | | |
| 9 | 80.3925 | 1.200 | 1.617 | 44.3 |
| 10 | 13.0369 | 5.400 | 1.440 | 94.5 |
| 11 | −7.6168 | 1.400 | 1.617 | 44.3 |
| 12 | −16.7348 | A1 | | |
| 13 | 23.5032 | 3.400 | 1.700 | 55.2 |
| 14 | −14.2452 | 1.100 | 1.617 | 44.3 |
| 15 | 92.0615 | A2 | | |
| 16 | −104.7364 | 1.100 | 1.561 | 53.8 |
| 17 | 11.4708 | 1.500 | | |
| 18 | −5.9185 | 2.020 | 1.855 | 23.7 |
| 19 | −5.2823 | 1.100 | 1.617 | 44.3 |
| 20 | −12.8144 | A3 | | |
| 21 | 1355.4370 | 1.200 | 1.607 | 37.8 |
| 22 | 16.6021 | 3.100 | 1.530 | 76.6 |
| 23 | −15.5387 | 0.300 | | |
| 24 | Flat | | | | and further comprising an achromatically corrected tube having a focal length of 195 mm, which is known per se.

With an entry pupil set to infinity and a vision field index of 20, variable air gaps A1, A2 and A3 are characterized by the following parameters:

| β | NA | A1 | A2 | A3 |
|---|---|---|---|---|
| 10× | 0.30 | 20.181 | 0.800 | 8.911 |
| 20× | 0.52 | 6.300 | 17.244 | 6.342 |
| 30× | 0.70 | 1.528 | 24.687 | 3.693 |
| 40× | 0.80 | 0.500 | 28.524 | 0.800 | wherein delimiting surfaces FL3, FL15, FL20 and FL24 have the following diameters:

| Surface Number | Diameter |
|---|---|
| FL3 | 2.80 |
| FL15 | 12.90 |
| FL20 | 7.20 |
| FL24 | 12.00 |

Figure 4:
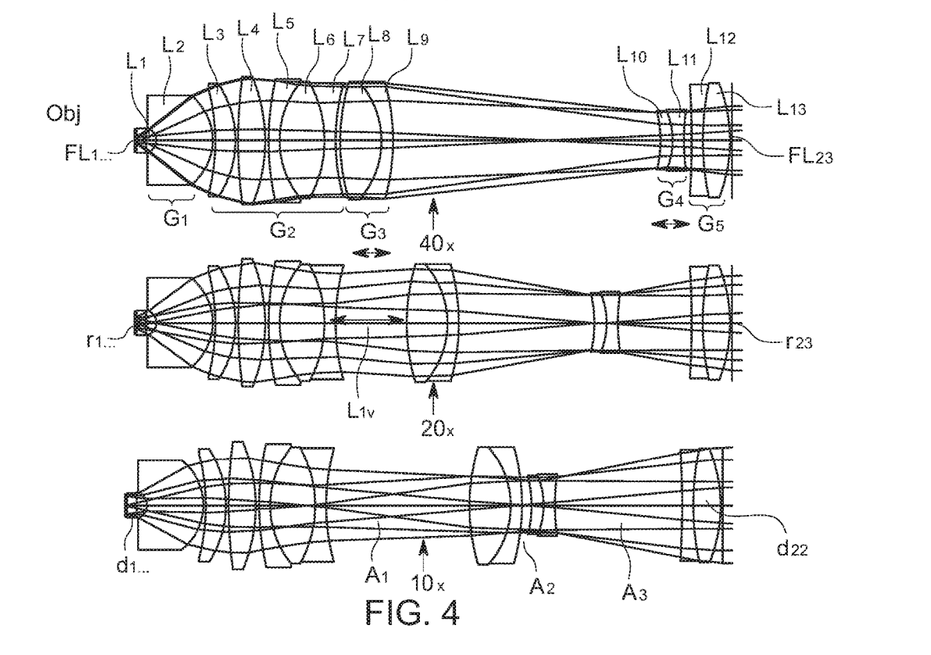
FIG. 4: a schematic representation of a fourth embodiment example of the zoom objective lens for a magnification of 10× to 40×.

FIG. 4 shows a schematic representation of a fourth embodiment of the zoom objective lens for magnifications of 10× (minimum), 20× (medium) and 40× (maximum), comprising, coming from the object side Obj, lens groups G1, G2, G3, G4 and G5, wherein the first lens group G1, the second lens group G2 and the fifth lens group G5 are fixed in relation to the object plane Obj and the third lens group G3 and fourth lens group G4 are axially displaceable and are characterized by variable air gaps A1. A2 and A3, as described in the previous embodiments. The figure further shows surfaces FL1 to FL23 and radii r1 to r23 of lenses L1 to L13, and the thicknesses or air gaps d1 to d22 thereof. The variable air gap L1v=A1, designated as L1v, between lens groups G2 and G3 decreases with a transition from a low to a high magnification.

The first lens group G1 of the zoom objective lens shown in this embodiment, which is used with immersion, consists of a cemented lens component comprising lenses L1 and L2, in which front lens L1 has a flat surface on the object side Obj. The refractive power of each of lens groups G2, G3 and G5 is positive, whereas the refractive power of lens group G4 is negative.

Lens group G2 consists of two individual lenses L3 and L4 and a triple cemented lens component, consisting of lenses L5, L6 and L7, whereas lens group G3 has two lenses L8 and L9, which are either cemented as shown, or are alternatively separate.

Lens group G4 consists of a dual cemented lens component comprising lenses L10 and L11, in which the meniscus lens L10 and the two centers of curvature thereof are located on the object side Obj.

Lens group G5 is a dual cemented lens component having lenses L12 and L13, in which biconvex lens L13 is located on the image side.

The fourth embodiment of the zoom objective lens for magnifications β of 10× to 40× with numerical apertures NA of 0.3 (at magnification 10×) and 0.8 (at magnification 40×) is characterized by the design data shown in the following table, in which radii r1 to r23 and the thicknesses or air gaps d1 to d22, and the variable air gaps A1, A2 and A3 are given in mm, whereas $n_e$ is the refractive index and $v_e$ is the Abbe number:

| Surface Number FL1-FL23 | Radius r1-r23 | Thickness d1-d22 | $n_e$ | $v_e$ |
|---|---|---|---|---|
| 1 | Flat | 0.170 | 1.526 | 54.3 |
| 2 | Flat | 1.047 | 1.334 | 55.9 |
| 3 | Flat | 1.110 | 1.460 | 67.7 |
| 4 | −1.4130 | 6.010 | 1.888 | 40.5 |
| 5 | −5.9570 | 0.300 | | |
| 6 | −20.8340 | 2.130 | 1.594 | 68.0 |
| 7 | −10.7450 | 0.262 | | |
| 8 | 47.6566 | 2.900 | 1.594 | 68.0 |
| 9 | −16.4292 | 0.304 | | |
| 10 | 28.7996 | 1.200 | 1.561 | 53.8 |
| 11 | 9.7156 | 4.800 | 1.435 | 94.7 |
| 12 | −12.4080 | 1.100 | 1.607 | 37.8 |
| 13 | 20.8340 | A1 | | |
| 14 | 20.2422 | 4.400 | 1.530 | 76.6 |
| 15 | −9.4424 | 1.200 | 1.617 | 44.3 |
| 16 | −23.5430 | A2 | | |
| 17 | −11.7130 | 1.300 | 1.855 | 23.7 |
| 18 | −7.9440 | 1.200 | 1.561 | 53.8 |
| 19 | 20.8340 | A3 | | |
| 20 | −115.4813 | 1.200 | 1.624 | 36.1 |
| 21 | 28.1840 | 2.900 | 1.498 | 81.2 |
| 22 | −15.9619 | 0.180 | | |
| 23 | Flat | | | | and further comprising a tube corrected according to ICS (Infinity-Color-Corrected System) having a focal length of 164.5 mm.

With an entry pupil set to infinity and a vision field index of 20, the variable air gaps A1, A2 and A3 are characterized by the following parameters:

| β | NA | A1 | A2 | A3 |
|---|---|---|---|---|
| 10× | 0.30 | 15.278 | 1.000 | 13.570 |
| 20× | 0.48 | 6.664 | 14.753 | 8.431 |
| 30× | 0.65 | 2.835 | 22.722 | 4.290 |
| 40× | 0.80 | 0.500 | 28.547 | 0.800 | wherein delimiting surfaces FL3, FL6, FL17 and FL23 have the following diameters:

| Surface Number | Diameter |
| --- | --- |
| FL3 | 2.56 |
| FL6 | 11.10 |
| FL17 | 5.86 |
| FL23 | 12.30 |

Figure 5:
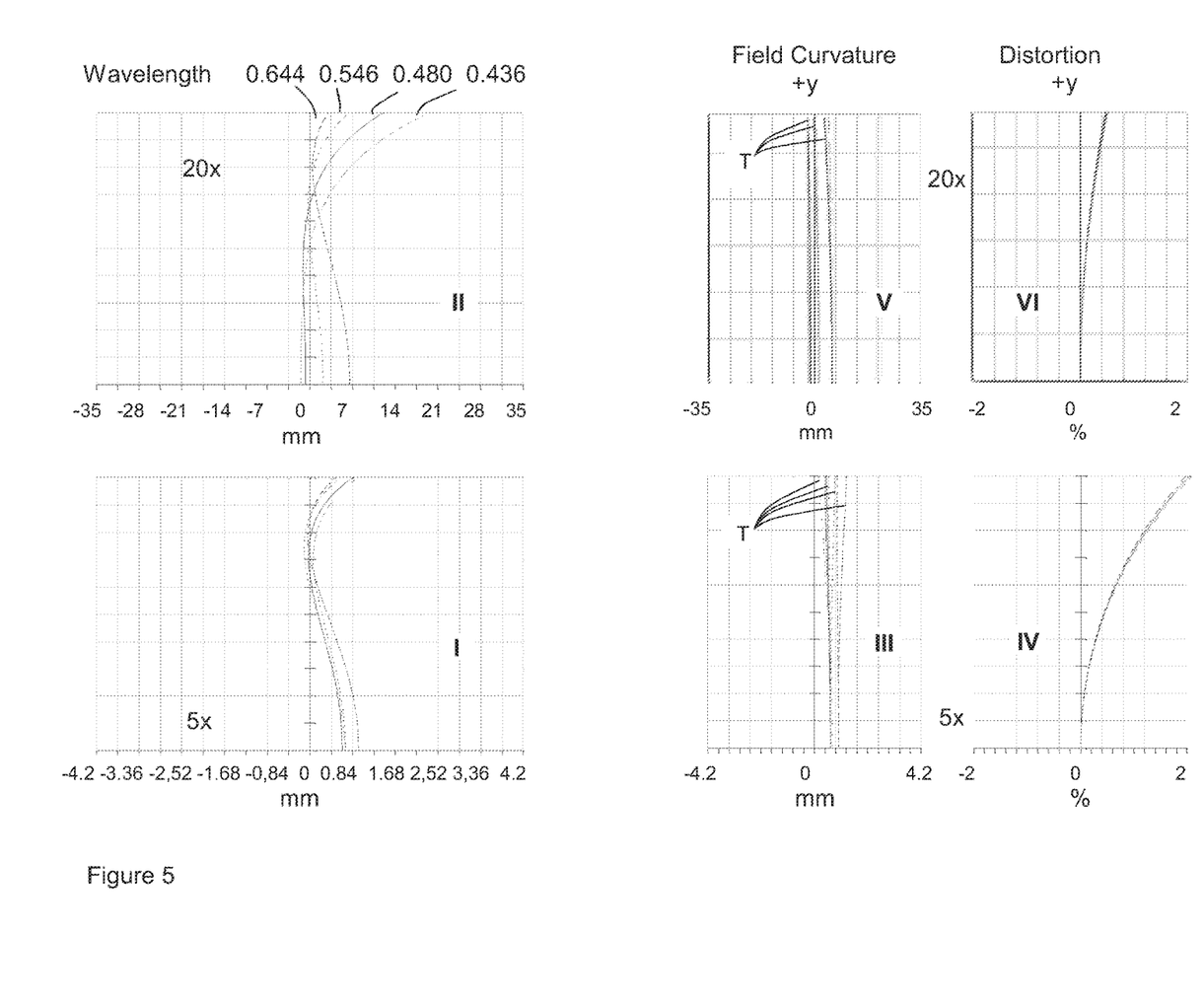
FIG. 5: a graphic representation of longitudinal aberrations as a function of aperture for four wavelengths, in each case for minimum and maximum magnification, field curvature, astigmatism and distortion, according to the first embodiment.

FIG. 5 shows, for the zoom objective lens according to first embodiment, a representation of longitudinal aberrations in the exit pupil, as a function of the aperture for four wavelengths (0.480 nm, 0.546 nm, 0.644 nm and 0.436 nm), for the minimum magnification β of 5× (image I) and the maximum magnification of 20× (image II). The field curvature and astigmatism for this zoom objective lens are also shown (images III and V).

Images III and V depict the sagittal and tangential image curves for the four wavelengths, as a function of the image height Y (maximum 11 mm), for both the minimum and maximum magnifications. Here, S stands for the sagittal and T for the tangential image curves. The S and T image curves are always indicated in pairs, and therefore only the T image curves are identified in the graphs. The astigmatism is derived from the difference between the two image curves.

The distortion (images IV and VI) as a function of the image height Y (maximum 11 mm) for the four different wavelengths is likewise shown for the minimum and maximum magnifications.

Figure 6:
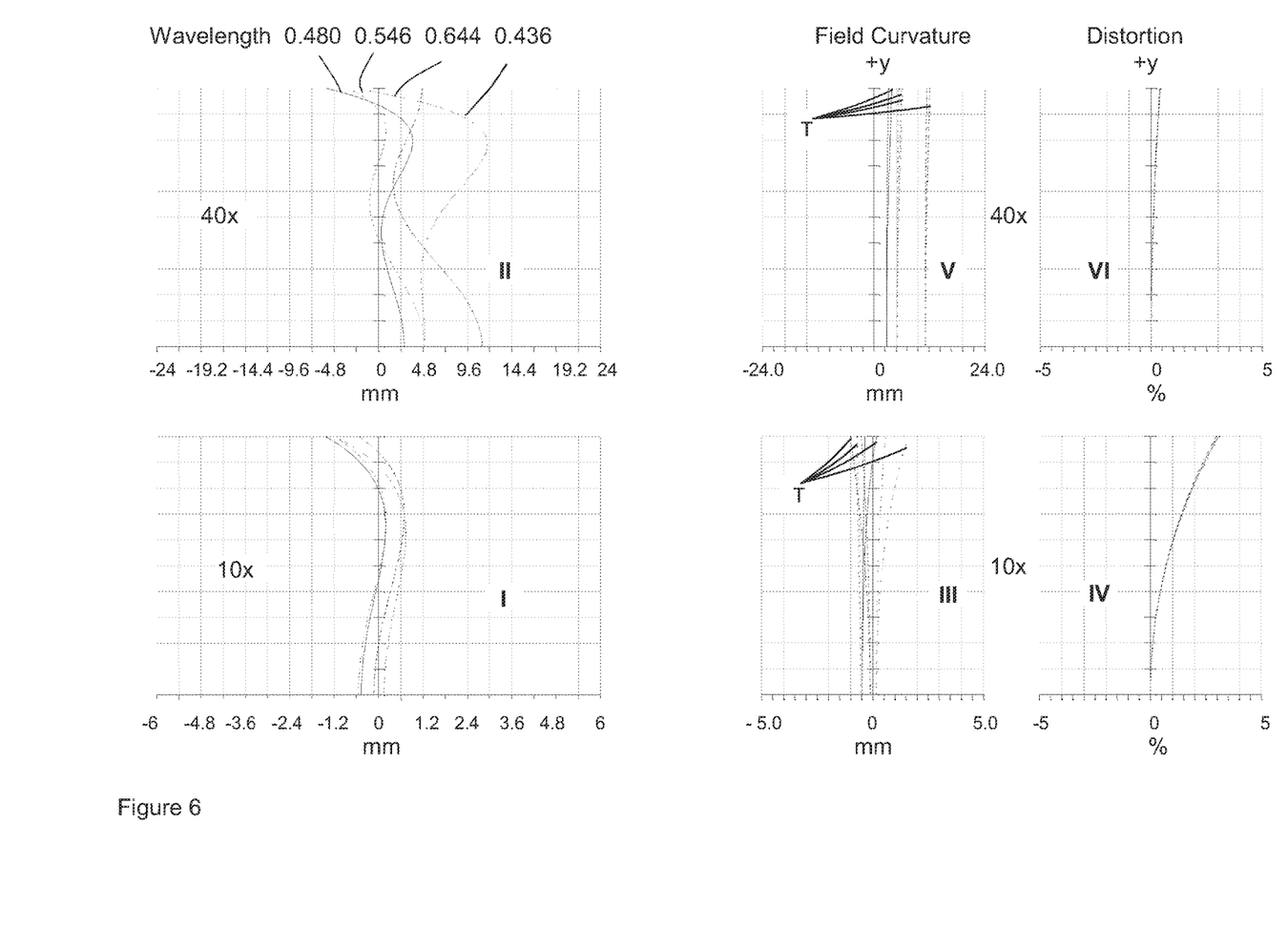
FIG. 6: a graphic representation of longitudinal aberrations as a function of aperture for four wavelengths, in each case for minimum and maximum magnification, field curvature, astigmatism and distortion, according to the second embodiment.

FIG. 6 shows, for the zoom objective lens according to the second embodiment, a representation of longitudinal aberrations in the exit pupil as a function of the aperture for four wavelengths (0.644 nm, 0.546 nm, 0.480 nm and 0.436 nm), for the minimum magnification β of 10× (image I) and the maximum magnification β of 40× (image II). Also shown for this zoom objective lens are the field curvature and the astigmatism (images III and V). Images III and V each depict the sagittal and tangential image curves for the four wavelengths, as a function of the image height Y (maximum 11 mm), each for the minimum and maximum magnifications. Here, S stands for the sagittal image curve and T for the tangential image curve. The S and T image curves are always indicated in pairs, therefore only the T image curves are labeled in the graph. The astigmatism is derived from the difference between the two image curves. The distortion (images IV and VI) as a function of the image height Y (maximum 11 mm) for the four different wavelengths is likewise shown for the minimum and maximum magnifications.

Figure 7:
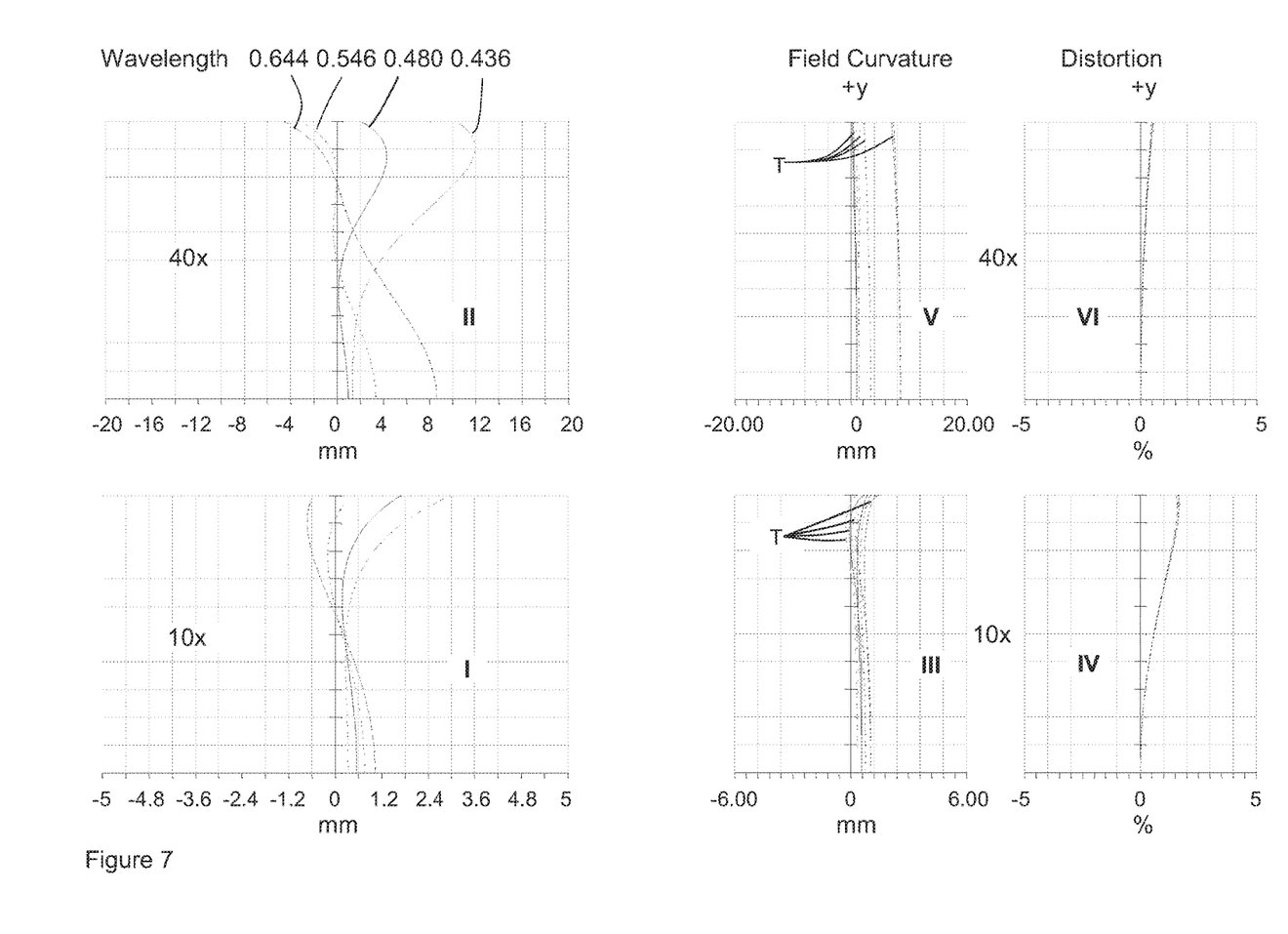
FIG. 7: a graphic representation of longitudinal aberrations as a function of aperture for four wavelengths, in each case for minimum and maximum magnification, field curvature, astigmatism and distortion, according to the third embodiment.

FIG. 7 shows, for the zoom objective lens according to the third embodiment, a representation of longitudinal aberrations in the exit pupil, as a function of the aperture for four wavelengths (0.644 nm, 0.546 nm, 0.480 nm and 0.436 nm), for the minimum magnification β of 10× (image I) and the maximum magnification β of 40× (image II) with a zoom objective lens according to embodiment example 3.

Also shown for this zoom objective lens are the field curvature and the astigmatism (images III and V). Images III and V each depict the sagittal and tangential image curve for the four wavelengths, as a function of the image height Y (maximum 11 mm), in each case for the minimum and maximum magnifications. Here, S stands for the sagittal image curve and T for the tangential image curve. The S and T image curves are always indicated in pairs, therefore only the T image curves are labeled in the graphs. The astigmatism is derived from the difference between the two image curves. The distortion (images IV and VI) as a function of the image height Y (maximum 11 mm) for the four different wavelengths is likewise represented for the minimum and maximum magnifications.

Figure 8:
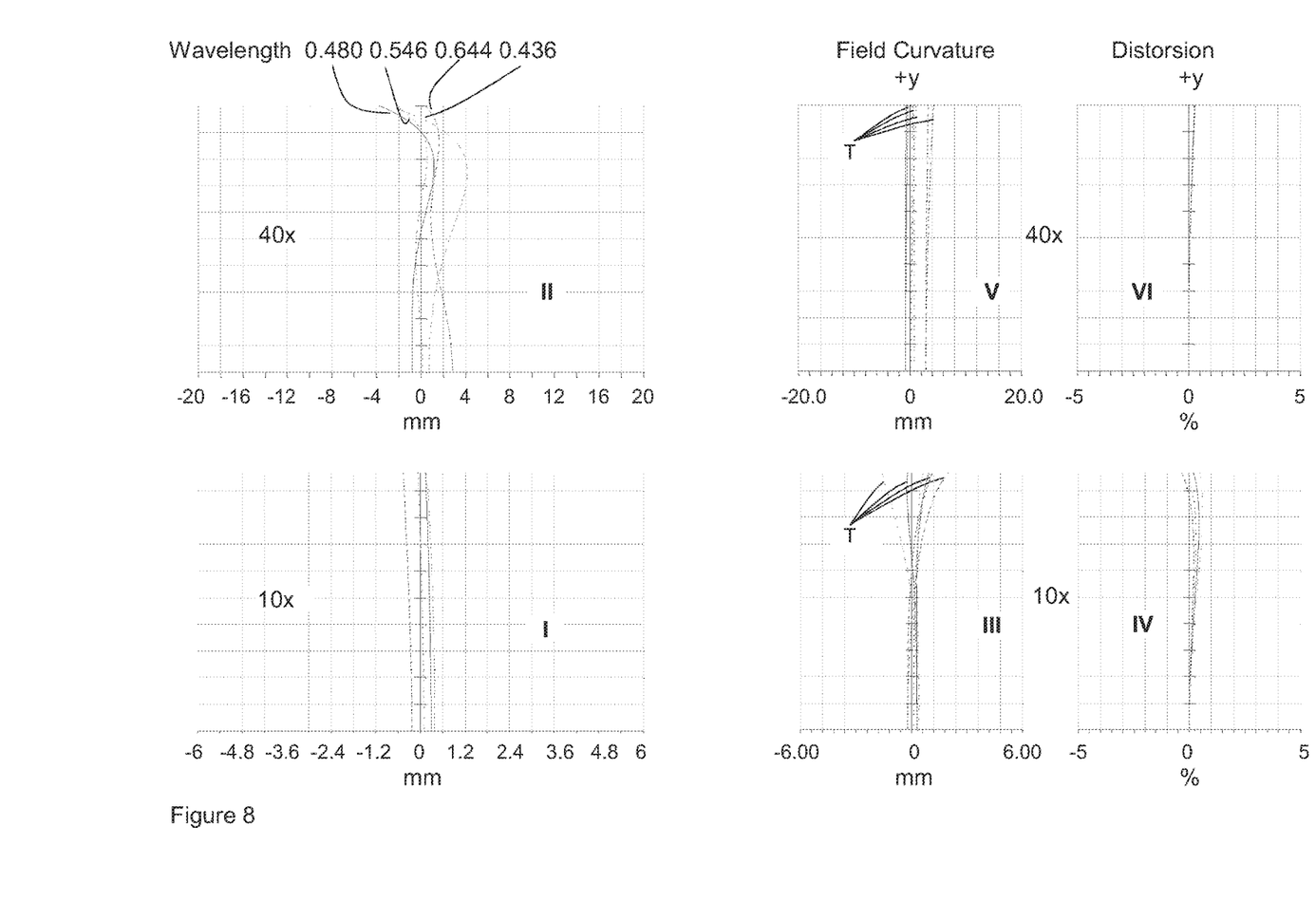
FIG. 8: a graphic representation of longitudinal aberrations as a function of aperture for four wavelengths, in each case for minimum and maximum magnification, field curvature, astigmatism and distortion, according to the fourth embodiment.

FIG. 8 shows, for the zoom objective lens according to the fourth embodiment, a representation of longitudinal aberrations in the exit pupil as a function of the aperture for four wavelengths (0.480 nm, 0.436 nm, 0.546 nm and 0.644 nm), for the minimum magnification β of 10× (image I) and the maximum magnification β of 40× (image II) with a zoom objective lens according to embodiment example 4. Also shown for this zoom objective lens are the field curvature and the astigmatism (images III and V). Images III and V each depict the sagittal and tangential image curves for the four wavelengths, as a function of the image height Y (maximum 11 mm), in each case for the minimum and maximum magnifications. Here, S stands for the sagittal image curve and T for the tangential image curve. The S and T image curves are always indicated in pairs, therefore only the T image curves are labeled in the graphs. The astigmatism is derived from the difference between the two image curves. The distortion (images IV and VI) as a function of the image height Y (maximum 11 mm) for the four different wavelengths is likewise shown for the minimum and maximum magnifications.

The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and sub combinations of the preceding elements and aspects.

The invention claimed is:

1. A zoom objective lens with continuously adjustable magnification β, comprising five lens groups, the first lens group, the second lens group and the fifth lens group being fixed in relation to an object and the third lens group and the fourth lens group being axially displaceable, in which the following conditions apply:

a variable air gap between the second lens group and the third lens group decreases or has a turning point with a transition from a low to a high magnification β, the refractive power of the second, third and fifth lens groups is positive and the refractive power of the fourth lens group is negative, wherein the first lens group is a single meniscus lens, wherein the second lens group consists of a maximum of two individual lenses, each having a positive refractive power, and a cemented lens component consisting of a maximum of three lenses, wherein the third lens group has either two individual lenses or a dual cemented lens component, wherein the fourth lens group consists of either a dual cemented lens component or a dual cemented lens component and an individual lens, wherein the dual cemented lens component has a meniscus lens, the centers of curvature of which lie on the object side, and wherein the fifth lens group is a dual cemented lens component, in which the biconvex lens lies on the image side.

2. The zoom objective lens according to claim 1, with a parfocal length of 60 mm and a structural length of ≤63.56 mm, the parfocal length being the length from the object plane to the objective lens mounting surface in front of a back stop, and the structural length being defined as the length from the object plane to the back stop.

3. The zoom objective lens according to claim 1, characterized in that, for displacing the third lens group and the fourth lens group, two adjustment elements are provided, which are actuated manually or by a motorized mechanism, in each case by means of a correcting ring.

4. The zoom objective lens according to claim 1, characterized in that the lenses have rims for the purpose of delimiting the beam bundle.

5. The zoom objective lens according to claim 1, characterized in that no aperture with an adjustable diameter for adjusting the magnification is provided.

6. A zoom objective lens with continuously adjustable magnification β, comprising five lens groups, the first lens group, the second lens group and the fifth lens group being fixed in relation to an object and the third lens group and the fourth lens group being axially displaceable, in which the following conditions apply:
- a variable air gap between the second lens group and the third lens group decreases or has a turning point with a transition from a low to a high magnification β,
- the refractive power of the second, third and fifth lens groups is positive and
- the refractive power of the fourth lens group is negative,
- wherein the first lens group is a cemented lens component, in which a front lens of the first lens group has a flat surface oriented toward the object side,
- wherein the second lens group consists of a maximum of two individual lenses, each having a positive refractive power, and a cemented lens component consisting of a maximum of three lenses,
- wherein the third lens group has either two individual lenses or a dual cemented lens component,
- wherein the fourth lens group consists of either a dual cemented lens component or a dual cemented lens component and an individual lens, wherein the dual cemented lens component has a meniscus lens, the centers of curvature of which lie on the object side, and
- the fifth lens group is a dual cemented lens component, in which the biconvex lens lies on the image side.

7. The zoom objective lens according to claim 6, with a parfocal length of 60 mm and a structural length of ≤63.56 mm, the parfocal length being the length from the object plane to the objective lens mounting surface in front of a back stop, and the structural length being defined as the length from the object plane to the back stop.

8. The zoom objective lens according to claim 6, characterized in that, for displacing the third lens group and the fourth lens group, two adjustment elements are provided, which are actuated manually or by a motorized mechanism, in each case by means of a correcting ring.

9. The zoom objective lens according to claim 6, characterized in that the lenses have rims for the purpose of delimiting the beam bundle.

10. The zoom objective lens according to claim 6, characterized in that no aperture with an adjustable diameter for adjusting the magnification is provided.

* * * * *